United States Patent [19]

Anderson

[11] Patent Number: 4,733,085

[45] Date of Patent: Mar. 22, 1988

[54] PHOTOSENSITIVE DOPANTS FOR LIQUID NOBLE GASES

[75] Inventor: David F. Anderson, Wheaton, Ill.

[73] Assignee: The United States of America as represented by the United States Department of Energy, Washington, D.C.

[21] Appl. No.: 880,628

[22] Filed: Jul. 1, 1986

[51] Int. Cl.$^4$ ............................................. G01T 1/185
[52] U.S. Cl. .................................... 250/374; 250/375; 250/385
[58] Field of Search ........................ 250/374, 375, 385

[56] References Cited

U.S. PATENT DOCUMENTS 4,429,228  1/1984  Anderson ............................ 250/374

OTHER PUBLICATIONS

Charpak et al, "The Photo-Ionization Proportional Scintillation Chamber", IEEE Trans. Nucl. Sci, NS-27(1), Feb. 1980, pp. 212–215.

Miyajima et al, "Proportional Counter Filled with Highly Purified Liquid Xenon", Nucl. Instr. and Methods, 134(2), Apr. 15, 1976, pp. 403–405.

*Primary Examiner*—Carolyn E. Fields
*Attorney, Agent, or Firm*—Michael J. Higgins; John M. Albrecht; Judson R. Hightower

[57] ABSTRACT

In an ionization type detector for high energy radiation wherein the energy of incident radiation is absorbed through the ionization of a liquid noble gas and resulting free charge is collected to form a signal indicative of the energy of the incident radiation, an improvement comprising doping the liquid noble gas with photosensitive molecules to convert scintillation light due to recombination of ions, to additional free charge.

13 Claims, 4 Drawing Figures

PHOTOSENSITIVE DOPANTS FOR LIQUID NOBLE GASES

CONTRACTURAL ORIGIN OF THE INVENTION

The United States Government has rights in this invention pursuant to Contract No. DE-AC02-76CH03000 between the U.S. Department of Energy and Universities Research Association, Inc.

BACKGROUND OF THE INVENTION

This invention relates to radiation detectors and more specifically to ionization-type radiation detectors employing liquid noble gas.

It will be understood by one skilled in the art that the term "radiation" as employed herein shall broadly include energetic particle radiation, such as electrons, alpha particles, or other heavy ions, as well as high energy electromagnetic radiation, such as x-rays or gamma rays. The term "detector" is broadly used to include devices capable of detecting radiation and may include means for measuring the energy and intensity of such radiation in a simple way or in a more complex way to form images.

Ionization-type detectors are well-known in the art. In a simple embodiment, an ionization-type detector may comprise a chamber containing a medium which may be a gas or a liquid. When radiation is introduced into the chamber and interacts with the molecules and atoms of the medium, the energy of the radiation is absorbed by the medium resulting in the production of ions. Generally, the number of ions produced will be proportional to the energy of the radiation. The ions are collected by means of a potential applied across electrodes within the chamber. The number of ions collected is related, inter alia, to the number produced in the medium and the strength of the electric field resulting from the voltage across the electrodes.

For the amount of collected charge to be a useful analog to the energy of the incident radiation, it is desirable that all or as much as possible of the energy of the incident radiation be absorbed through ionization of the medium. The number of molecules of the medium available to interact with incident radiation is clearly related to the physical size of the chamber as well as the density of the medium. It is preferable to use a medium with a higher density rather than increase the dimensions of the chamber because it results in an instrument that is more compact and has greater position resolution. Thus, in many applications it is desirable to use a high density liquid noble gas as a medium for an ionization detector. Liquid argon (LAr) for example, is a practical medium for calorimetry in high energy physics and liquid xenon (LXe) has been used for two-dimensional x-ray and gamma ray imaging devices.

In general, an ionization detector is referred to as an ionization chamber when the electric field is just large enough to collect the free charge produced by the ionizing events but not so large as to accelerate the free charge to the point that secondary ionization takes place. More sensitive detectors known as proportional chambers or proportional counters use a higher voltage to produce secondary ionization, effectively amplifying the collected charge. This effect is sometimes referred to as an avalanche process. Proportional amplification of collected charge has been practically achieved in gas filled detectors but has not been achieved in liquid noble gas detectors.

Another disadvantage in using liquid noble gases with certain highly ionizing radiation such as heavy ion beams is that although copious ions are produced when the energy of the radiation is deposited in the liquid noble gas, the high charge densities result in most of the free electrons being lost to recombination before they can be collected.

It has been suggested by T. Doke, PORTUGAL PHYS. 12 (1981)9, that a LAr detector for heavy ions may be constructed to obtain the advantage of the liquid noble gas medium, wherein charge would be collected and scintillation photons resulting from the recombination would be collected by separate detector means and the two signals added together to indicate the energy of the incident radiation. However, since scintillation photons are emitted in all directions, collecting all or a meaningful amount of the scintillation light or weighting the scintillation signals to account for inefficiencies in light collection is problematic.

Two classes of dopants have previously been used with liquid noble gas detectors. Molecules such as ethylene and methane have been used to cool excess electrons thus improving the charge collection time by reducing diffusion. This results in better energy resolution but actually reduces the amount of charge collected, which reduces the sensitivity of the measurement. This was reported by Shibamura, et al. Nucl. Instr. and Methods. 131 (1975)249. Xenon has been added to LAr to increase the ionization yield by converting excitons in the LAr into additional free charge. This approach, however, does not prevent the loss of free charge due to scintillation as discussed above. This approach was reported by Kubota et al. Phys. Rev. B13 (1976)1649.

Photosensitive materials have previously been used in the gaseous phase as a medium in a secondary ionization detector used to detect ultraviolet scintillation photons emitted from the medium in a primary detector employing noble gases in a liquid or gaseous phase. See for example, A. Polycarpo, Nucl. Instr. and Methods, 196, (1982) 53 or U.S. Pat. No. 4,429,228, issued Jan. 31, 1984, to David F. Anderson.

Thus, it is an object of the present invention to provide a method of detecting radiation using a liquid noble gas ionization detector with increased sensitivity and increased energy resolution. It is another object of the invention to provide a method of converting scintillation photons to collectable free charge in a high energy ionization-type radiation detector. It is yet another object of the invention to provide a liquid xenon, ionization-type x-ray detector in which practical proportional amplification of collected charge is achieved. Additional objects, advantages, and novel features of the invention will be set forth in part in the following description and will be readily apparent to those skilled in the art.

SUMMARY OF THE INVENTION

In accordance with the present invention, a method for detecting radiation is provided which comprises the steps of dissolving a photosensitive dopant in a liquid noble gas, placing the liquid noble gas in an ionization-type detector, introducing radiation to be detected into said detector, collecting free ions by an electric field means, and counting the collected free ions by electronic circuit means. Also provided is an apparatus comprising a chamber, liquid noble gas within said chamber, photosensitive material dissolved in said liquid noble gas, means for introducing radiation into said chamber, means for collecting ions within said chamber, and means for counting the number of ions collected.

DETAILED DESCRIPTION OF THE INVENTION

Figure 1:
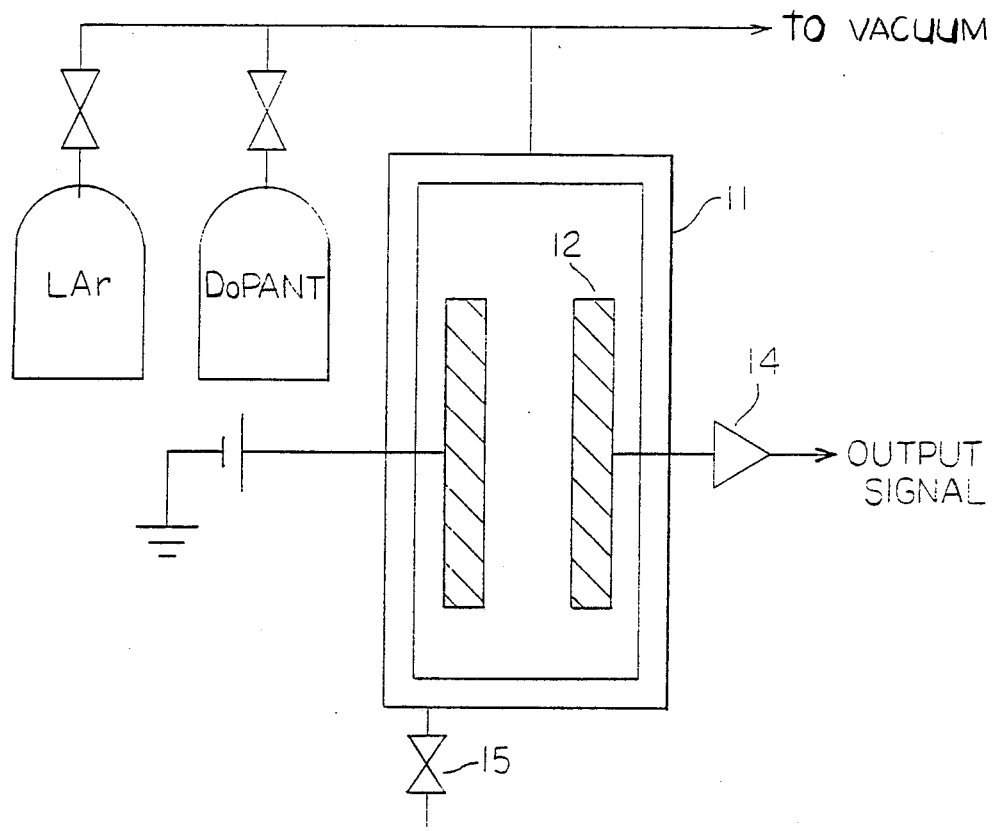
FIG. 1 is a schematic view of a simple ionization-type radiation detector.
Figure 2:
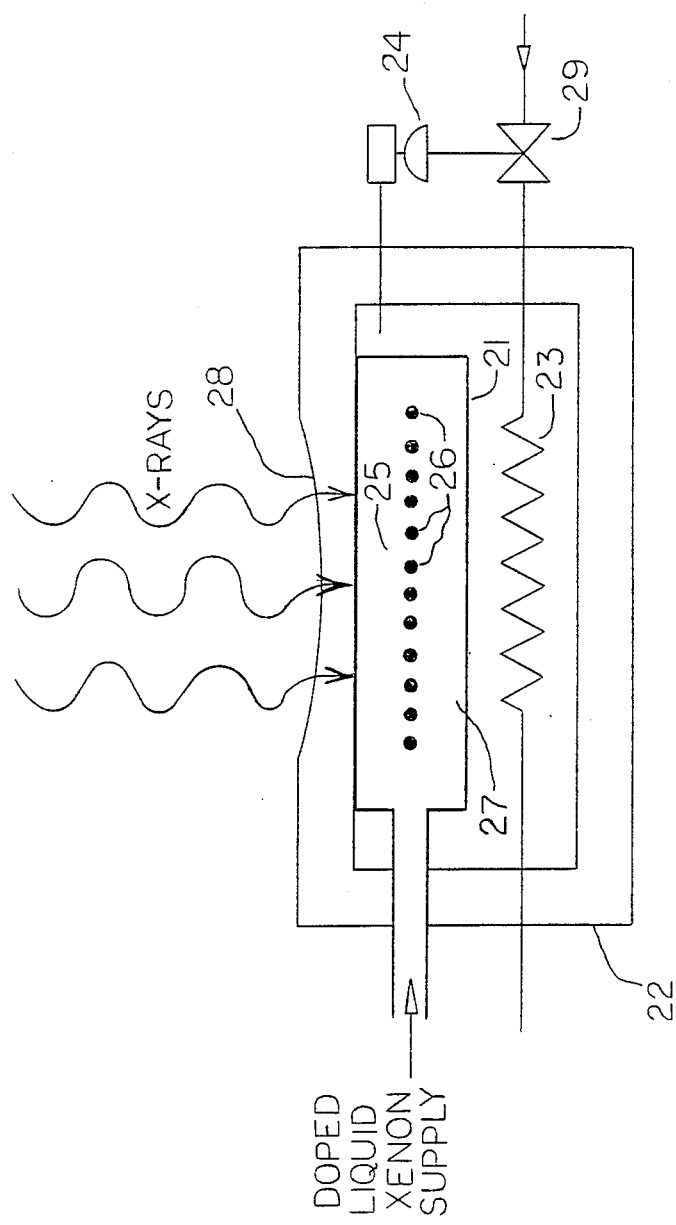
FIG. 2 shows an embodiment of a multi-wire proportional chamber apparatus which is suitable for detecting x-rays and providing a two-dimensional image thereof.

For purposes of describing the present invention and the advantages thereof, applicant will refer to several specific devices such as the test detector depicted in FIG. 1 and the multi-wire proportional chamber depicted in FIG. 2. It will be appreciated that these devices are examples of a class of devices refered to as liquid noble gas ionization detectors. *Radiation Detectors and Measurement* by Glenn F. Knoll, (1975, John Wiley & Sons) is a well known text describing various embodiments of ionization-type detectors for a plurality of applications. One skilled in the art will recognize that the practice of the present invention may be applicable in many of these embodiments.

Referring to the LAr test detector depicted in FIG. 1, insulated ionization chamber 11 contains liquid argon. Radiation source 12, which also serves as a cathode, is $^{241}$Am which emits alpha particles with energy of 5.5 Mev. The alpha particles interact with the LAr, ionizing the argon atoms. Anode 13 is maintained at a high voltage with respect to cathode 12. Free charge comprising electrons and positive ions, are accelerated respectively toward anode 13 and cathode 14 and collected and counted by electronic circuit means 14. The circuit means for applying voltage across the electrodes and for counting the collected ions are well known in the art. The amount of charge collected provides an analog for the energy for the ionizing radiation. The sensitivity of the measurement is related to the amount of charge collected. Generally, the amount of charge collected may be increased by increasing the magnitude of the electric field. This increase, however, is limited by the amount of free charge available in the liquid argon. In LAr high charge density is initially achieved by the interaction of the argon and the alpha radiation; however, much of the charge produced by the original ionizing event is lost to recombination which produces scintillation photons. According to the present invention, LAr may be doped with photosensitive molecules to convert the scintillation photons to free charge.

The doping of the liquid noble gas may be accomplished by first evacuating the chamber 11 and then filling the chamber to a fraction of an atmosphere with the gaseous photosensitive dopant. Argon is introduced into and then condensed in the chamber by liquifying means well known in the art (not shown in FIG. 1). A drain 15 may be provided in the chamber for removing a fraction of the doped LAr before adding additional argon to control the concentration of dopant in the LAr. Alternatively, the noble gas and the photosensitive dopant may be mixed at room temperature in a gaseous state and then the mixture condensed to liquid within the chamber. These and other means of dissolving dopant materials in liquid noble gases are well known to those skilled in the art.

A photosensitive dopant is a material that is soluble in a liquid noble gas and has a low ionization potential at liquid noble gas temperatures such that the molecules of the dopant may be ionized by scintillation photons in the UV spectrum. Photosensitive dopants are molecules which have a low ionization potential ($I_g$) in the gas phase. When such materials are dissolved in liquid noble gases their photo-ionization potential becomes lower than in the gas phase by about 0.7 ev. LAr produces scintillation photons having a mean energy of 9.5 ev; thus effective photo-sensitive dopants for LAr will be materials with $I_g \leq 10.2$ ev.

As mentioned above, a second criteria for choosing dopants is solubility. Henry's Law states that for non-polar solvents the mole fraction of solute is proportional to the vapor pressure. Since values for vapor pressure of organic materials are seldom available for liquid noble gas temperatures, such values must be extrapolated from existing data. Non-polar materials are preferable to avoid the formation of colloids at liquid noble gas temperatures, which would be expected with materials with a large dipole moment.

Materials that have been found to be successful as photosensitive dopants for LAr are listed in Table 1. Table 1 also lists the value of their ionization potential, the dipole moment, the estimated pressure at 90K, and the charge collected for 0.1 kv/mm and 1.0 kv/mm applied field in the detector. The values for collected charge are normalized to the charge collected for alpha particles in pure LAr at the same electric fields. allene and TMG (tetramethylgermanium) were most effective at increasing collected charge among the dopants tested. For example, with allene in solution with liquid argon in the test detector at a concentration of 14 parts per million and an applied electric field of 1.0 KVmm$^{-1}$, 2.5 times as much charge was collected as compared to the charge collected using pure LAr. The concentrations listed are those for the best performance measured.

Figure 3:
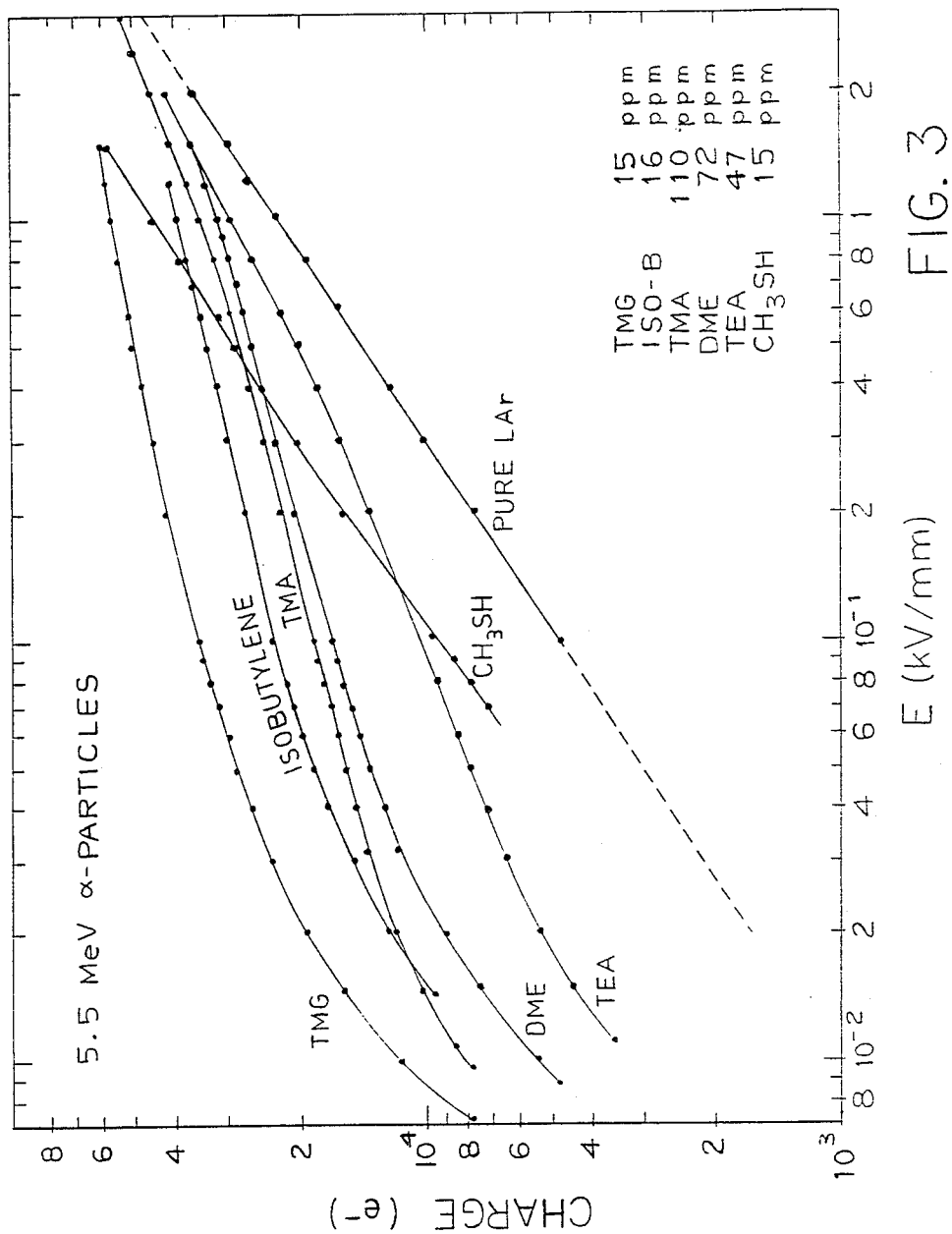
FIG. 3 is a graph showing the collected charge in an ionization chamber as a function of the electric field strength for LAr with and without photosensitive dopants.

The charge collected as a function of electric field for pure LAr and for six of the tested dopants are shown in FIG. 3.

Figure 4:
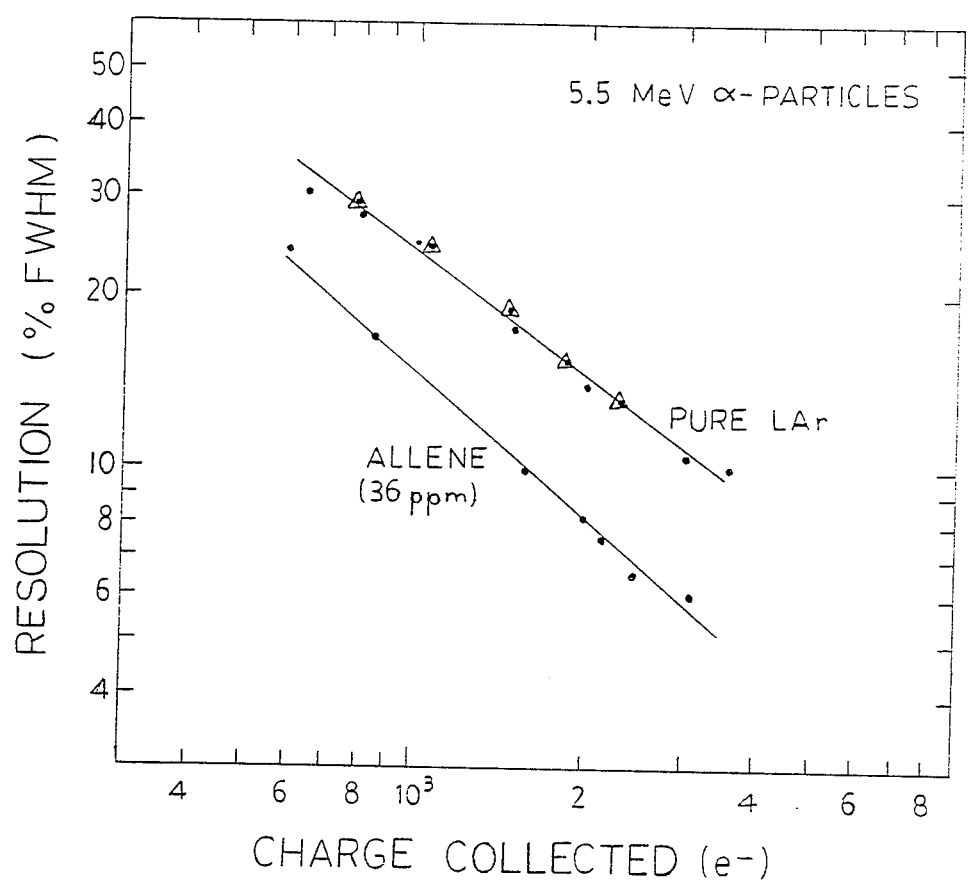
FIG. 4 is a graph depicting the effect on energy resolution as a function of field strength with and without photosensitive dopants in a LAr detector.

An unforeseen advantage of the photo-sensitive dopants is that the energy resolution is improved more than is accounted for by the increase in charge collected. This can be seen in FIG. 4 where the energy resolution (as % full width at half maximum) is plotted as a function of charge collected for pure LAr and LAr doped with allene to a concentration of 36 ppm.

FIG. 2 is a schematic of a liquid xenon multi-wire proportional chamber that may be used to provide two dimensional x-ray images for medical applications. This apparatus without photosensitive dopants is known in the art. It is described in detail by Zaklad et al., *A Liquid Xenon Radio Isotope Camera*, IEEE Trans. Nucl. Soc. NS-19 (1972)206. It is described herein as exemplary of the type of device with which the present invention may be practiced. Applicant's device, with photosensitive dopants in solution with the liquid noble gas medium, provides an instrument with significantly greater sensitivity than previously available. The advantages, particularly in medical applications where there is a need to minimize the exposure of patients to radiation is self-evident.

A chamber 21 containing doped LXe, preferably doped with TEA (triethylamine) or TMA (trimethylamine), is within a vacuum insulated dewar 22. The dewar is filled with a coolant such as Freon-11 ® surrounding the ionization chamber 21. Cooling means comprising a heat exchanger 23, temperature control means 24 and a source of liquid nitrogen are provided for maintaining the temperature of the LXe in the ionization chamber. Within the ionization chamber 21, the anode 25 comprises a plurality of fine wires 26 suspended parallel to one another and lying in a common plane parallel to the top and bottom of the chamber. The cathode 27 is integral with the top and bottom walls of the chamber and comprises parallel spaced apart conducting strips lying perpendicular to the anode wires. The anode is maintained at a high voltage by electric circuit means not shown.

A window 28, transparent to x-rays is provided to admit the x-rays to be detected. In LXe, x-rays produce proportional scintillation. By means of the dopants utilized in the present invention, the scintillation photons are converted to free charge, providing proportional amplification of collected charge. Each of the anode wires 26 and cathode strips is electrically connected to separate electronic counting means for providing signals in a manner well known in the art. The anode wires then provide one coordinate of the two-dimensional image while the induced charge on the cathode strips provides the second coordinate.

One skilled in the art will recognize that the charge amplification provided by the present invention may be controlled by using well known techniques similar to those used in gas-filled proportional counters.

The foregoing is considered illustrative of the principles and advantages of the present invention. Numerous modifications and changes will be readily apparent to those skilled in the art. Therefore, the embodiments described in detail above are not meant to limit the invention to the exact construction or procedures described and suitable modifications may be made falling within the scope of the invention as defined by the claims which follow.

The embodiments of the invention to which an exclusive property or privilege is claimed are defined as follows:

1. A method of detecting radiation with an ionization detector comprising the steps of:
    dissolving a photosensitive dopant in a noble gas;
    liquifying the doped noble gas;
    placing the doped liquified noble gas in said ionization detector;
    introducing radiation to be detected into said ionization detector;
    collecting free ions in the ionization detector;
    counting the free ions collected within the ionization detector.

2. The method of claim 1 wherein said noble gas comprises argon wherein said method is useful for detecting relativistic heavy ion radiation.

3. The method of claim 2 wherein said photosensitive dopant is allene.

4. The method of claim 2 wherein said photosensitive dopant is tetramethylgermanium.

5. The method for claim 1 wherein said noble gas comprises xenon and said ionization detector comprises a multi-wire proportional chamber wherein said method is useful for detecting and imaging x-ray radiation.

6. A method of detecting radiation with an ionization detector comprising the steps of evacuating said ionization detector;
    filling said detector with a gaseous photosensitive dopant;
    condensing a noble gas within said ionization detector;
    introducing radiation to be detected into said ionization detector;
    collecting free ions in the ionization detector;
    counting the free ions collected within the ionization chamber.

7. The method of claim 6 wherein said noble gas comprises argon wherein said method is useful for detecting relativistic heavy ion radiation.

8. The method for claim 6 wherein said noble gas comprises xenon and said ionization detector is a multi-wire proportional chamber wherein said method is useful for detecting and imaging x-ray radiation.

9. An ionization-type radiation detector for detecting relativistic heavy-ion radiation comprising:
    a chamber;

TABLE I

| | | $I_g$ (ev) | Dipole Moment debyes | Estimated Pressure 90° K. (Torr) | Charge Collected (LAr = 1) | | Concentration (ppm) |
|---|---|---|---|---|---|---|---|
| | | | | | 0.1 kVmm$^{-1}$ | 1.0 kVmm$^{-1}$ | |
| TEA | $(C_2H_5)_3N$ | 7.50 | 0.66 | — | 2.2 | 1.3 | 47 |
| TMA | $(CH_3)_3N$ | 7.82 | 0.612 | $3 \times 10^{-8}$ | 3.4 | 1.6 | 110 |
| TMT | $(CH_3)_4Sn$ | 8.25/8.76 | — | $4 \times 10^{-12}$ | 3.0 | 1.6 | 1.5 |
| Cyclohexene | $C_6H_{10}$ | 8.75 | — | — | 2.1 | 1.3 | 3.6 |
| 1,3-Butadiene | $C_4H_6$ | 9.06 | 0 | $4 \times 10^{-7}$ | 4.6 | 1.9 | 17 |
| Cis & Trams 2 Butene | $C_4H_8$ | 9.13 | 0(trans) | $5 \times 10^{-8}$ | 3.6 | 1.6 | 72 |
| TMG | $(CH_3)_4Ge$ | 9.2/9.29 | — | $3 \times 10^{-10}$ | 7.4 | 2.6 | 15 |
| Isobutylene | $C_4H_8$ | 9.23 | 0.5 | $5 \times 10^{-7}$ | 4.9 | 1.8 | 16 |
| Methyl Mercaptan | $CH_3SH$ | 9.44 | 1.52 | $2 \times 10^{-8}$ | 2.0 | 2.0 | 15 |
| Pentene (Technical) | $C_5H_{10}$ | 9.5 | — | $1 \times 10^{-9}$ | 3.1 | 1.5 | 7 |
| Allene | $C_3H_4$ | 9.53 | 0 | $1 \times 10^{-5}$ | 6.5 | 2.5 | 14 |
| TMS | $(CH_3)_4Si$ | 9.86 | 0.525 | $8 \times 10^{-9}$ | 4.6 | 1.8 | 5.8 |
| DME | $(CH_3)_2O$ | 10.0 | 1.30 | $5 \times 10^{-8}$ | 3.6 | 1.4 | 14 | triethylamine (TEA), trimethylamine (TMA), tetramethyltin (TMT), tetramethylgermanium (TMG), tetramethylsilane (TMS), dimethylether (DME)

an anode and a cathode within said chamber;

an ionizable medium within said chamber, said medium being a solution of a photosensitive dopant in liquid argon;

means for admitting radiation to be detected into said chamber which radiation interacts with said liquid argon to produce free ions, some of which free ions recombine to produce scintillation photons, which scintillation photons interact with said photo sensitive dopant to produce additional free ions;

means for applying an electrostatic potential across said anode and cathode for collecting free ions;

electronic circuit means connected to said anode and cathode, for counting ions collected thereon.

10. An ionization type radiation detector including a chamber; an anode within said chamber where said anode comprises a plurality of spaced-apart, generally parallel wires lying in a common plane; a cathode within said chamber where said cathode comprises a plurality of spaced-apart generally parallel conducting strips lying in a common plane generally parallel to the plane of said anode wires and spaced apart therefrom, said cathode strips being generallly perpendicular to said anode wires; a liquid noble gas within said chamber; means for admitting radiation to be detected into said chamber; means for applying an electrostatic potential between said anode and said cathode; electronic circuit means connected to said anode and said cathode for counting ions collected thereon;

wherein the improvement comprises a photo-sensitive dopant dissolved in said liquid noble gas.

11. The detector of claim 9 wherein said liquid noble gas comprises liquid xenon.

12. The detector of claim 11 wherein said photosensitive dopant comprises triethylamine.

13. The detector of claim 11 wherein said photosensitive dopant comprises trimethylamine.

* * * * *